US 6,577,378 B1

(12) United States Patent
Gallagher et al.

(10) Patent No.: US 6,577,378 B1
(45) Date of Patent: Jun. 10, 2003

(54) SYSTEM AND METHOD FOR LIGHT FALLOFF COMPENSATION IN AN OPTICAL SYSTEM

(75) Inventors: Andrew C. Gallagher, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 141 days.

(21) Appl. No.: 09/643,544

(22) Filed: Aug. 22, 2000

(51) Int. Cl.[7] .................... G03B 27/72; H04N 1/21
(52) U.S. Cl. .................... 355/35; 355/71; 358/302
(58) Field of Search ..................... 355/35, 32, 40, 355/71, 38; 358/302; 348/362

(56) References Cited

U.S. PATENT DOCUMENTS

| 5,155,524 A | 10/1992 | Oberhardt et al. | |
| 5,467,165 A | 11/1995 | Jacob et al. | |
| 5,638,153 A | 6/1997 | Zahn et al. | |
| 5,828,441 A | * 10/1998 | Narita et al. | 355/32 |
| 5,870,205 A | 2/1999 | DeClerck et al. | 358/302 |
| 5,917,578 A | 6/1999 | Nakamura | 355/40 |
| 5,926,258 A | 7/1999 | Mandl et al. | |

FOREIGN PATENT DOCUMENTS

| DE | 4022 055 A1 | 1/1992 | ........... G03B/27/72 |
| EP | 0 691 568 A1 | 1/1996 | ........... G03B/27/72 |
| GB | 2 136 142 A | 9/1984 | ........... G03B/27/32 |

* cited by examiner

*Primary Examiner*—Russell Adams
*Assistant Examiner*—Peter B. Kim
(74) *Attorney, Agent, or Firm*—David M. Woods

(57) ABSTRACT

An apparatus and method for compensating for light falloff in a film master frame of a photographic image. A masking unit is positioned between the master frame and copy material in an optical printer. The masking unit may be an LCD panel. A controller calculates a light falloff compensation function to produce a light falloff correction parameter that is used to control the transmittance values of a plurality of pixels in the masking unit. When a photographic copy is made, the masking function serves to counteract light falloff that existed in the master frame to produce a copy with reduced effect from light falloff. Control and selection of the light falloff compensation function can be based on a number of factors related to the camera type, lens type, film type, flash type, and other factors that created the light falloff on the master frame. In addition, one or more of the master frames from a roll of film may be scanned to generate data to drive the light falloff compensation function. The data may be averaged to improve performance of the system.

38 Claims, 7 Drawing Sheets

SYSTEM AND METHOD FOR LIGHT FALLOFF COMPENSATION IN AN OPTICAL SYSTEM

FIELD OF THE INVENTION

The invention relates generally to the field of photography. More specifically, the present invention relates to systems and methods for improving image quality in optical systems.

BACKGROUND OF THE INVENTION

It is understood by those skilled in the art that lenses produce non-uniform illumination at a focal plane. This leads to non-uniform exposure of film, when imaging a uniformly illuminated surface. For instance, light from a uniformly lit gray wall, perpendicular to an optical axis, will pass through a lens and form an image that is brightest at the center and dims gradually as it moves radially away from the center. The intensity of light in the image will form a pattern that dims in accordance with the $\cos^4$ of the angle between the optical axis, the lens, and the point in the image plane.

In addition, other factors such as vignetting, contribute to the lens light falloff phenomena. Light falloff caused by vignetting results from mechanical interference by the lens with the path of some of the light rays as they pass through the lens and other opto-mechanical structures.

In the traditional optical photographic system, every image captured on photographic film contains some component of lens light falloff. The lens of an optical printer also introduces lens light falloff during the printing process. However, in the case of negative photographic film, this falloff occurs to the negative of the original scene, and thus has the effect of counteracting the lens light falloff in the negative and providing a means of partial falloff compensation. In the case of reversal films, the lens of the optical printer creates more lens light falloff, thus exacerbating the effect.

In general, the level of falloff compensation counteracted by the optical printer for negative film images is less than the amount of falloff caused by the optics of a capture device. For this reason, there is a need to compensate for residual falloff induced by a capture system on a captured scene.

In U.S. patent application Ser. No. 09/293,197 filed Apr. 16, 1999, which is entitled "A Method for Compensating Digital Images for Light Falloff and an Apparatus Therefor", invented by the present inventors as the present application and assigned to the present assignee, the teachings of which are incorporated herein by reference, describe a method of correcting for lens light fall of in a digital photographic copier. In the case of a digital image, manipulation ability is enhanced by the fact that the images reside in digital form in a computer so that digital manipulation is readily available on a pixel by pixel basis.

However, in the case of an image created by a traditional film based photographic system, the approach involving digital manipulation of every picture element is not always practical or feasible. Consequently, a need exists to compensate for lens falloff in a captured scene where the image resides on traditional photographic film materials.

In another aspect of photography and illumination of scenes captured thereby, when a flash is used in order to provide more illumination on a scene than is available from ambient lighting, an effect similar to lens light falloff is often observed in the captured image. This is due to the fact that most electronic flash units do not provide uniform illumination over the image field, and in particular where the lens angle of view is at or greater than the flash units designed angle of coverage. The effect is to reduce the level of illumination near the edges of the scene, in a similar fashion to lens light falloff. Consequently, there exists a need to create a flash light falloff compensation for those scenes where flash falloff degrades image quality.

In U.S. Pat. Nos. 5,926,258; 5,155,524; 5,467,165; and 5,638,153 all assigned commonly to AGFA-Gavaert, a photographic copier with a masking unit positioned in the optical path is described. This masking unit is described in terms of an array of LCD elements, each of which may assume different shades of gray. In the aforementioned U.S. patents, the unsharp mask gray values are derived from the density values of the image and superimposed onto the masking unit for the purpose of compressing the dynamic range of the image such that the optical printer can adapt the contrast range of the captured image to the contrast range available with the printed medium and therefore produce an image that preserves as much detail from the original scene as is practicable. The process employed in these patents is to mask the image in strict accordance with the illumination values found in the digital image data. This is referred to generally as a contrast mask and is not designed to be effective, nor is it effective, for compensating for lens light falloff or flash light falloff.

Consequently, a need remains in the art for a system or method for compensating for lens light falloff and flash light falloff in an optical photographic copying process.

SUMMARY OF THE INVENTION

The need in the art is addressed by the apparatus and methods of the present invention. The illustrative embodiments include an apparatus for compensating for light falloff present in a photographic master frame at the time the master frame is printed in an optical photographic copier. The apparatus includes a masking unit that has a plurality pixel elements, each controllable in light transmittance. The controller is operable to adjust the transmittance of the plurality of pixel elements in accordance with a light falloff function. In one embodiment, a control input for specifying one of a plurality of light falloff compensation functions defining a light falloff correction parameter for the master frame is provided. The controller then operates in accordance with the light falloff function specified by the control input.

The illustrative embodiments also include a method of compensating for light falloff present in a photographic master frame at the time the master frame is printed to a copy in an optical photographic copier that has a masking unit having a plurality of individually controllable pixel elements, a controller, and a control input. This is accomplished by receiving an input parameter by the control input, calculating a light falloff correction parameter by the controller based on said input parameter, generating an individual compensation value for at least one controllable pixel elements based on said correction parameter, and superimposing the compensation value onto the master unit so that the light falloff in the photographic copy is reduced.

These and other aspects, objects, features and advantages of the present invention will be more clearly understood and appreciated from a review of the following detailed description of the preferred embodiments and appended claims, and by reference to the accompanying drawings.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
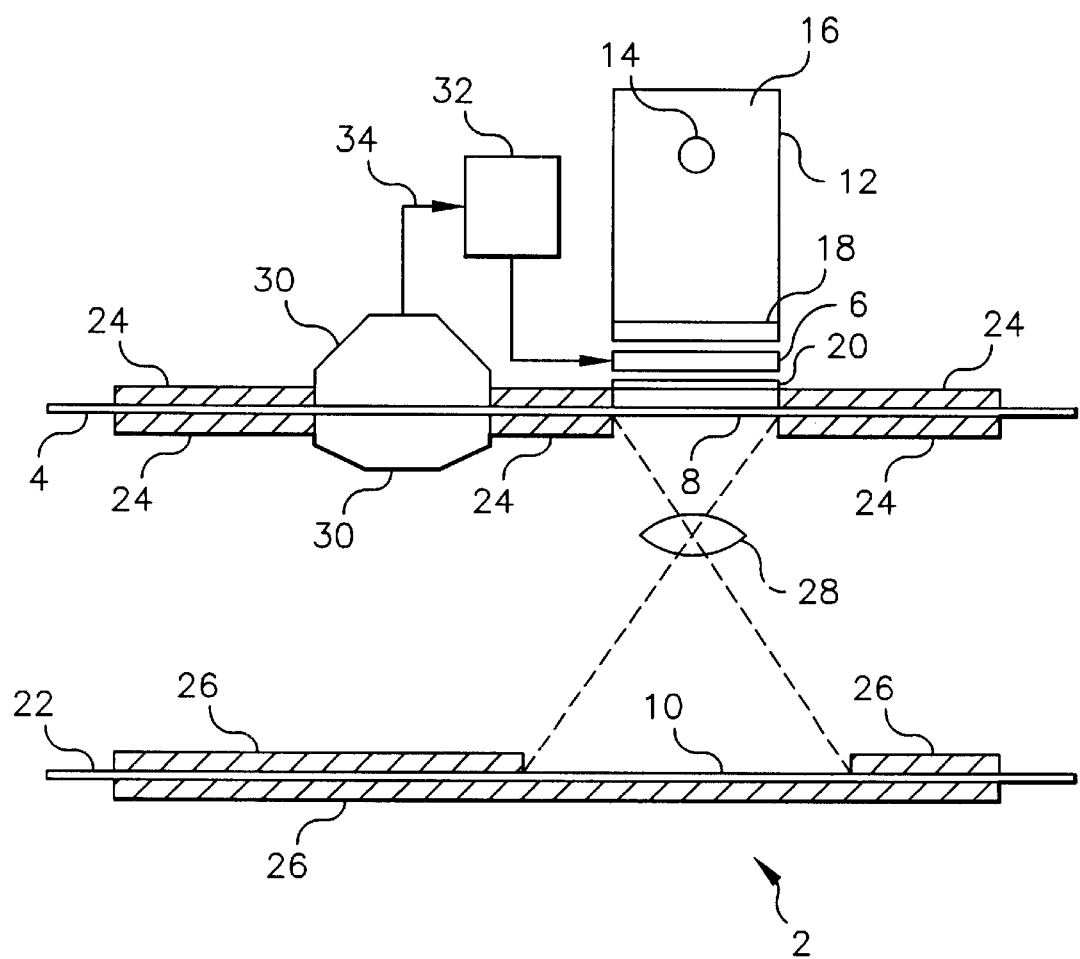
FIG. 1A is a diagram of the photographic copier with the masking unit in place.

In the present invention, a conventional photographic copier is modified to compensate for light falloff in the original negative. A light falloff compensation mask is placed in the optical path of a photographic copier. The mask consists of a large number of pixels that can be individually adjusted for transmittance. Through an analysis process and the receipt of a control signal, a processor adjusts the transmittance of the various pixels to counteract the naturally occurring light falloff. FIG. 1 shows an illustrative embodiment of the present invention. This embodiment utilizes a photographic copier 2, generally for the purpose of creating photographic prints from conventional film negatives, but also from reversal films onto reversal photographic paper. The film negative 4 may be from a conventional film roll like the Advanced Photo System (APS), 35 mm film, 120/220 roll film, or any other film format. The falloff compensator utilizes a masking unit 6 to compensate for expected light falloff.

The photographic copier 2 in FIG. 1 copies, or prints, the negative, or master, 8 onto photographic paper, or copy material, 10. The master 8 is typically a transparent exposure or frame of a negative film 8 while the copy material 10 is typically a photosensitive material such as photographic paper.

The photographic copier 2 includes an illuminating or exposing unit 12 which serves to illuminate the master 8 and to expose the copy material 10. The illuminating unit 12 includes a light source 14, a mixing tube 16, a diffusing disc 18, a masking unit 6, and a matte or ground glass smoothing disc 20. The masking unit 6 is a liquid crystal panel (hereinafter 'LCD') in this illustrative embodiment, which may be a matrix of individual cells or pixels. In another embodiment, the LCD may be replaced with an LED matrix, which is light producing in its function. In this alternative embodiment, the light source 14, the mixing tube 12 and the diffusing disc 20 can be eliminated.

The light emitted by the illuminating unit 12 includes the wavelength ranges corresponding to the primary colors blue, green and red. The copy material 10 is, at least on occasion, exposed to radiation in all of these wavelength ranges. While the light source in the illustrative embodiment uses a mixing tube 16, it is understood by those skilled in the art the any of a variety of light sources could be employed. These include, but are not limited to, a condenser lens systems, a cold light head, and the aforementioned mixing chamber.

In the illustrative embodiment described by FIG. 1, the LCD 6 is position behind diffusion disk 20 so as to render the pixels making up the LCD array slightly out of focus. This is called an unsharp mask. It is understood by those skilled in the art that a mask is called a sharp mask when it is in focus and an unsharp mask when it is out of focus. Using a sharp mask is sometimes desirable, however, in the case of correcting an image for light falloff, the desired adjustments to image density do not directly correspond to individual image elements, therefore it is preferred that an unsharp mask be used so that no artifacts of the mask appear in the copied image.

In modern applications, the photographic copier 2 is an automated system that feeds the film 4 and photographic paper 22 sequentially and automatically through the machine. A support of platen 24 is provided for the film and defines a support plane for the same. Similarly, a support platen 26 is provided for the copy material 22 and holds the latter flat in a predetermined plane during exposure. An objective, or copy lens, 28 functions to project an image of the master 8 onto a section 10 of copy material 22. Subsequently, the section 10 is cut from the photographic paper 22 to produce the final photographic copy, or print.

The illuminating unit 12, objective 28, and platens 24 and 26, at least in part, constitute a copying or printing station of the photographic copier 2.

The film 4 is transported along a predetermined path in order to bring different frames into register with the illuminating unit 2. Upstream of the copying station there may be a scanning station in which the frames of the film may be scanned to generate density values for reference use as will be described for alternative embodiments hereinafter. The density values obtained in this fashion are sent to a computer 32 where they are transformed into control values. The control values are used to regulate the LCD 6 which serves as the masking unit to generate a mask. Control lines 34 and 36 connect the computer 32 to the scanning station 30 and LCD 6, respectively.

LCDs have been found to be especially well-suited for masking applications. Partially because the gray value of light transmittance of LCD's is voltage dependent and is therefore readily controllable. Moreover, LCD's are highly stable in regards to temperature and transparency as well as color neutrality, which depends only to a small degree on the viewing angle. LCD's used in the present invention require individual control of each of a plurality of cells, or pixel elements.

Figure 2:
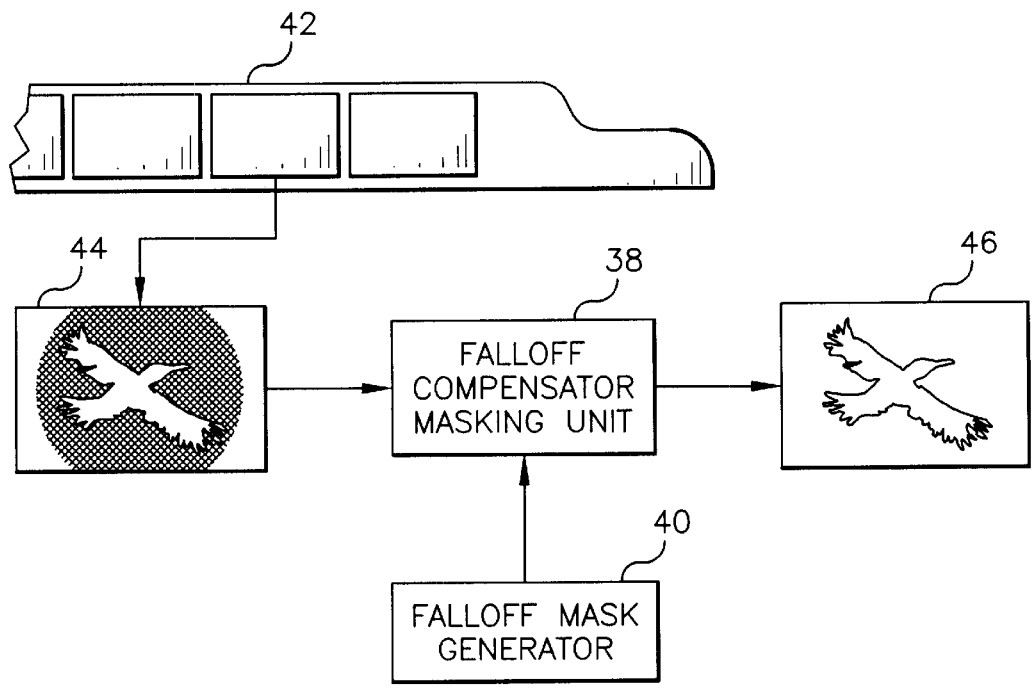
FIG. 2 is a representation of the components of the falloff mask generator.

In the present invention, the masking unit is used for the purpose of reducing or correcting the light falloff that is often observed in optical systems, as shown generally in FIG. 2. As will be discussed, light falloff is caused by lens light falloff and, if an electronic flash is used during exposure, also in flash light falloff. As mentioned above various film types may be used. A mask falloff compensation function mfcf is provided and at least a light falloff correction parameter f is calculated to control the light falloff compensation mask, which is optimized to the best light falloff compensation in the copied image. As will be described, the light falloff compensation mask calculation consists of a collection of compensation values, one per pixel of the masking unit, typically an array of LCD elements. Additional parameters may have an influence on the light falloff compensation and are discussed in the various embodiments of the invention. The light falloff compensation function fcf and the light falloff correction parameter f enables a calculation of a compensation value for each pixel element $p_{ij}$ for the masking unit. It is clear to those skilled in the art, that there is no need to apply the compensation value to every pixel element $p_{ij}$. The compensation value may be applied to selected pixel elements as needed to optimize the final copied image. In the following description the compensation value, calculated individually for each pixel $p_{ij}$, is applied to each pixel element $p_{ij}$ of the masking unit and the result is a light falloff corrected image.

Again referring to FIG. 2, to carry out the process, the falloff compensator masking unit 38 superimposes the mask falloff compensation function mfcf(x,y) onto the masking unit (the LCD array 6 in FIG. 1). The mask falloff compensation function mfcf(x,y), which is calculated by the falloff mask generator 40, utilizes the falloff compensator 38 to apply the falloff compensation necessary to compensate for the falloff of the capture device and/or flash conditions, in addition to the falloff compensation performed naturally by the lens of the photographic copier. This superposition is performed on an element by element basis to each position in the LCD or liquid crystal matrix array of the masking unit. The falloff compensator 38 has the corresponding transmittance as described by mfcf(x,y). Such device control (calibrating the transmittance of an LCD element to achieve a desired density ) is well known to those skilled in the art and will not be further discussed. An LCD element may herein be referred to as a pixel. Note that although the falloff compensator 38 is described in the present invention is an LCD device (the masking unit 6 in FIG. 1), any other controllable addressable device consisting of elements which vary in transmissitivity may be utilized as the masking unit. In operation, a strip of film 42 is sequentially fed into the copying machine and an individual frame 44 is placed in register for copying. The falloff mask generator 40 calculates the falloff compensation function and thereby controls the falloff compensator 38 to adjust the transmittance of light through to the final image 46, thereby compensating for light falloff and rendering a correct image. Accordingly, the masking unit will allow a copy to be made of the original without the falloff signature that typically exists in optical copying systems.

Those skilled in the art will recognize that the masking unit may simultaneously accomplish two objectives: the application of the falloff compensation function as well as the dynamic range reduction by unsharp mask as described in U.S. Pat. No. 5,926,258, which is incorporated herein by reference. The desired transmittance values of an unsharp mask U(x,y) may be cascaded (by multiplication) with the desired transmittance values of the mask falloff compensation function mfcf(x,y) in order to calculate a combination mask C(x,y) which compensates for both falloff and adjusts the dynamic range of the image. Pixel by pixel addition or multiplication is well known to those skilled in the art and will not be further discussed. This combination mask may be applied to the LCD array of the masking unit at the time the copy is made.

Figure 3:
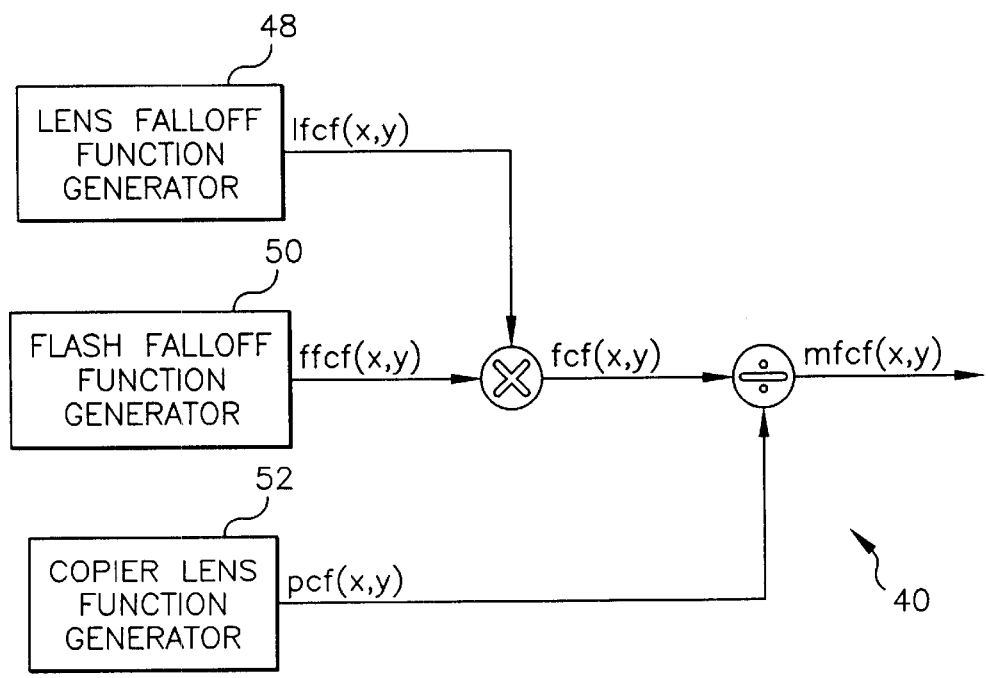
FIG. 3 is a functional block diagram of the falloff mask generating function in an illustrative embodiment.

Referring to FIG. 3, which illustrates a more detailed view of the falloff mask generator 40. The light falloff compensation function fcf(x,y) is designed to be symmetric about the horizontal and vertical axes of the original image. The light falloff compensation function fcf(x,y) is composed of two falloff compensation functions, each compensating for a specific source of falloff. The lens falloff function generator 48 compensates for lens light falloff. The lens falloff compensation function lfcf(x,y) is generated by a lens falloff function generator 48. A second falloff compensation function compensates for flash falloff. The flash falloff compensation function ffcf(x,y) is generated by a flash falloff function generator 50. As shown in FIG. 3, these two functions ffcf(x,y) and lfcf(x,y) are multiplicatively combined to form the falloff compensation function fcf(x,y). Finally, as shown in FIG. 3, the mask falloff compensation function mfcf(x,y) is formed by dividing the falloff compensation function fcf(x,y) by a functional description of the falloff compensation performed implicitly by the lens of the photographic copier, pcf(x,y), generated by the photographic copier function generator 52.

Both the lens falloff compensation function, lfcf(x,y), and the flash falloff compensation function, ffcf(x,y), may be described mathematically as functions of the position of pixel elements in the LCD array 6. Both the lens falloff compensation function lfcf(x,y) and the flash falloff compensation function ffcf(x,y) are evaluated for the number of lines and pixels contained in the LCD array 6.

Figure 5:
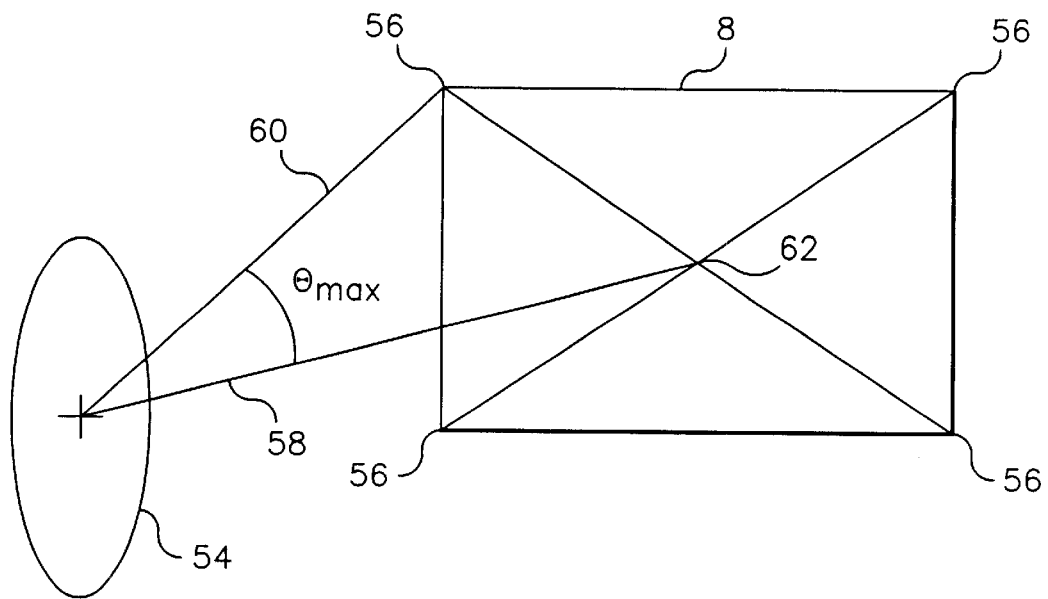
FIG. 5 is a geometric diagram of the master frame and lens relationship.
Figure 6:
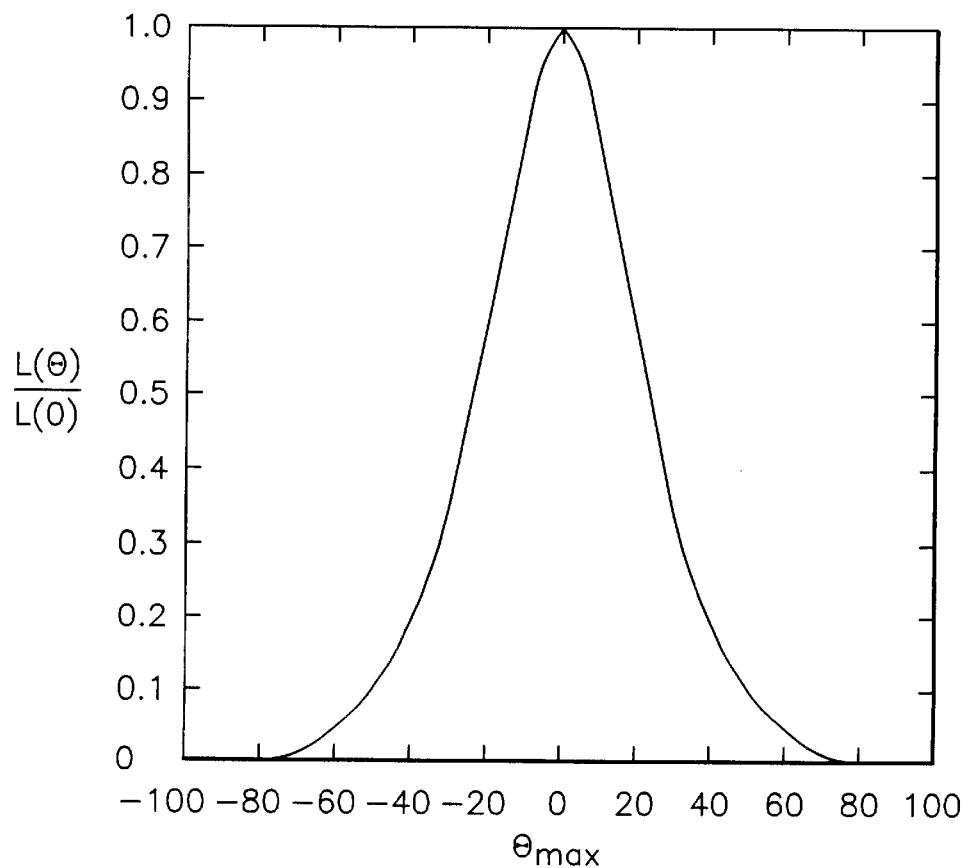
FIG. 6 is a graphical representation of the determination of the light falloff correction parameter.

In an illustrative embodiment, the lens falloff compensation function lfcf(x,y) is defined in Equation 1. Practically, in a camera system with lenses, the falloff results in non-uniform exposure to the film. The necessary parameters for calculation of the falloff at each position on a film plane or image plane is shown in FIG. 5. A lens 54 images a scene onto the master frame 8. A maximum angle $\Theta_{max}$ occurs between the optical axis and the light ray 60 to each corner 56 of the master frame 8 and is known as the semi-field angle. For any given camera, the maximum angle $\Theta_{max}$ (Equation 2) may be calculated as:

$$lfcf(x,y) = \cos^4 \Theta \quad [1]$$

$$\Theta_{max} = \tan^{-1}\left(\frac{c}{f}\right) \quad [2]$$

where f is the light falloff correction parameter and in some cases it can be the focal length of the lens used to image the scene onto the master frame 8; c is the diagonal distance from a center 62 of the master frame 8 to the corners 56 thereof. The ratio of exposure in a corner 56 of the image to the exposure on an optical axis 62 defined by the imaging lens 54 is expressed in Equation 3. A typical one-dimensional plot of Equation 3 is shown in FIG. 6.

$$\frac{L(\Theta_{max})}{L(0)} = \cos^4\left[\tan^{-1}\left(\frac{c}{f}\right)\right] \quad [3]$$

where $L(\Theta_{max})$ is the exposure in the corners 56 of the film frame and L(0) is the exposure in a center of the film frame 62 defined by the optical axis 58.

Table 1 shows an evaluation of the expression in Equation 2 typical for a few common camera systems.

TABLE 1 cos⁴ falloff in common cameras

| Camera type | Focal length (mm) | Frame size (mm) | $\Theta_{max}$ (rad) | $\frac{L(\Theta_{max})}{L(0)}$ | stops | 1000 log (E) |
|---|---|---|---|---|---|---|
| 35 mm SUC | 32 | 24 × 36 | 0.59 | 0.47 | 1.1 | 326 |
| 35 mm SLR | 50 | 24 × 36 | 0.41 | 0.71 | 0.49 | 148 |
| 35 mm SLR zoom | 80 | 24 × 36 | 0.26 | 0.87 | 0.2 | 61 |
| APS SUC | 23 | 16.7 × 30.2 | 0.64 | 0.41 | 1.3 | 386 |

The 5$^{th}$ column of data in Table 1 shows the estimated relative exposure resulting from identical radiances imaged through the optical lens 54. The remaining columns all display that same data in other metrics. The 6$^{th}$ column shows the falloff in terms of photographic stops. Merely because of the lens falloff, the corners of a film frame 56 in a Single Use Camera (SUC) is over 1 stop down from the center of the image. This value is converted to logE by converting with the factor 300 logE/stop.

In most prints, the result of this falloff is not easily detected on a single stimulus basis. There are several reasons for this. First, the falloff occurs as a very low spatial frequency. For a 4 inch by 6 inch print, the falloff is in the range of 0.10 cycles/inch to 0.05 cycles/inch (at standard viewing distance of 14 inches this becomes 0.025 cycles/degree to 0.014 cycles/degree.) The human eye is not especially sensitive to frequencies in this range. Most scenes with a moderate amount of detail will hide the falloff from human perception. However, the falloff is often noticeable in photographs of a clear blue sky. The corners of the image will appear in a much darker blue than the sky nearer the center of the print. In such cases, the falloff is quite obvious and objectionable.

Another reason that photographic prints often do not appear to have falloff is a result of the optical printing process. The photographic copier also contains a lens with geometric falloff. Because this lens falloff occurs to the negative, the overall effect of the falloff incurred by the printing process will partially compensate for the falloff generated by the lens or optical system of the camera. If the falloff profile of the printer lens exactly matches the falloff profile of the camera lens, a system free of lens falloff will result. However, the L(Θmax)/L(0) ratio is typically about 0.85 for a conventional photographic printer. This means that the majority of cameras introduce more falloff into the imaging process than the printer is capable of correcting. The falloff correction implicitly performed by the lens of the photographic copier means that the masking device has less work to do. In other words, the creation of the mask falloff compensation function must take into account the falloff compensation that the photographic copier performs. The falloff compensation performed by the lens of the photographic copier, expressed in terms of position on the masking unit, is the photographic copier function pcf(x,y):

$$pcf(x,y) = \cos^4(d/f3) \quad [4]$$

where d is the distance from a particular pixel of the LCD array located at (x,y) to the center of the LCD array, measured in pixels, as shown in Equation 4. The photographic copier function generator 52 determines this function. In a typical optical photographic printer, the image irradiance at the corner 56 of the image is approximately 85% of the irradiance at the center of the image 62. In order to approximate this level of implicit falloff compensation with the method of the present invention, the value of f must be 3.62*$d_{max}$, where $d_{max}$ is the distance of the corner to the center of the LCD array (i.e. x=$x_{max}$ and y=$y_{max}$). In the case of the LCD array consisting of 100 by 150 elements, $d_{max}$ is 90 and f=326.

As an alternative, a more general deterministic formula for calculating the value of d is given below. The parameter $f_3$ represents a normalized focal length of the lens. The value of $f_3$ is generally the distance from the lens to the masking unit. However, the value of $f_3$ may also be adjusted such that the minimum value of pcf(x,y) is equal to the value of L($\Theta_{max}$)/L(0). Thus, the value of $f_3$ may be solved according to Equation 5 as:

$$f_3 = d_{max}\left(\cos^{-1}\left[\sqrt[4]{\frac{L(\Theta_{max})}{L(0)}}\right]\right)^{-1} \quad [5]$$

Figure 4:
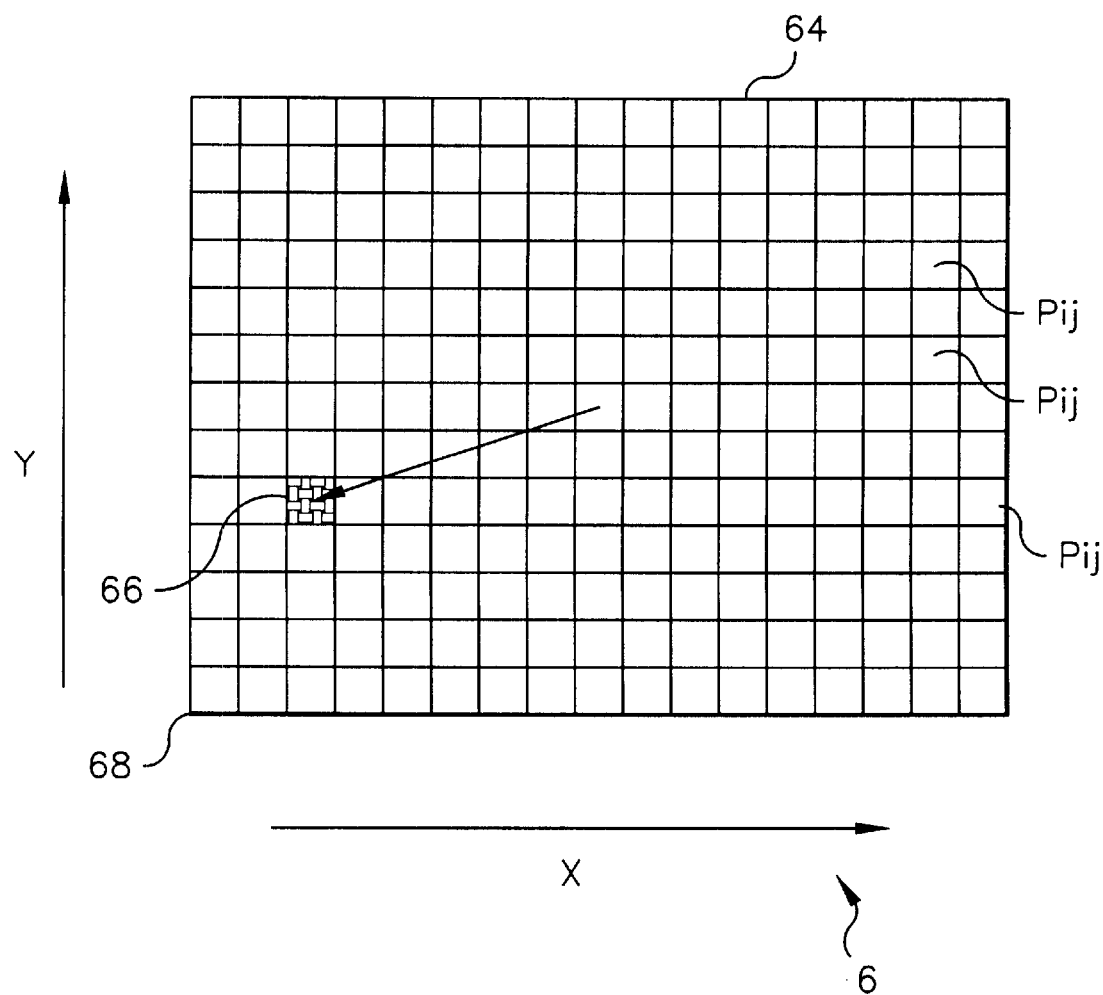
FIG. 4 is a diagram of the masking unit pixel arrangement.

Alternatively, the determination of the light falloff compensation function for the lens falloff is done with Equation 1. Here, an individual compensation value is calculated for every pixel of the image passed to the falloff compensator 38, per Equation 6.

$$\Theta = \tan^{-1}\left(\frac{d}{f}\right) \quad [6]$$

Where d is the distance in pixels of a particular point from LCD array 6 center, illustrated as item 64 in FIG. 4, and f is the light falloff correction parameter, in some cases it is the focal length in pixels of the imaging lens 54. As shown below, f can also be a fit parameter. In this case a plurality of film frames are used to find an averaged light falloff compensation function, thereby f is varied to provide the best fit for the overall light falloff compensation function. d is calculated according to Equation 7. The distance d is measured in pixels.

$$d = \sqrt{\left(x - \frac{x_{max}}{2}\right)^2 + \left(y - \frac{y_{max}}{2}\right)^2} \quad [7]$$

x is the coordinate of the LCD element of the masking device in the x-direction of the LCD array 6 and y is the coordinate of the LCD element of the LCD array 6 in the y-direction. $x_{max}$ and $y_{max}$ are the maximum dimensions of the masking unit 6 in the x-and y-direction respectively. For example, $y_{max}$=100 and $x_{max}$=150.

As mentioned above the LCD array 6 is represented by a two-dimensional array of elements. FIG. 4 is a simplified representation of the two dimensional array of the LCD pixel elements $p_{ij}$. Here i is the number of a pixel in the x-direction and j is the number of a pixel in the y-direction. A center 15 is defined for the LCD array 6. The distance d from the center 64 to a particular pixel 66 is calculated according to the above equation wherein x is the distance of the pixel (see hatched pixel in FIG. 4) from a bottom left hand corner 68 in the x-direction of the LCD array 6 and y is the corresponding distance in the y-direction. $x_{max}$ and $y_{max}$ are the maximum dimensions of the LCD array 6 in the x and y-direction.

Thus, as mentioned previously, f is an unknown parameter. f is regarded as the light falloff correction parameter and its determination enables the precision of an individual correction value for each pixel value. The following description provides various possibilities to determine the light falloff correction parameter.

First, the light falloff compensation function fcf is determined by the focal length f of the image capture lens. In order to get the best correction, an operator may simply adjust a slider of a graphical user interface, which applies a light falloff compensation function fcf generated with any number of choices for the parameter f The operator may adjust the slider until he is pleased with the results. The resulting value for the focal length f is saved and input to the lens falloff function generator 48 as the light falloff correction parameter.

In addition, f may be defined by the format of a photographic film, that at least one image is generated from. The scanner 30 may determine format of the photographic film. The film format provides information about the camera used for picture taking. For instance, assuming that the film format is known, (i.e. APS or 35 mm), the value for f may be selected that it is appropriate for a wide variety of camera types of the specified format. In general, the value for f appropriate for APS cameras is smaller than the value off appropriate for 35 mm film cameras (see Table 1).

In addition, if the camera type (i.e. single use camera, point and shoot, single lens reflex) is known, an even more appropriate value for f may be chosen. The camera type may be determined by the photographic printer, which has means to read or detect camera information somewhere on the photographic film. Additionally, the film rolls exposed by the various camera types may be processed on separate printers. This makes it easy to set a special f-value for the various camera types (see Table 1). For instance, the value off should be smaller for single use camera images than single lens reflex cameras, since in general, single use camera lenses have shorter focal lengths than single lens reflex camera lenses.

Figure 7:
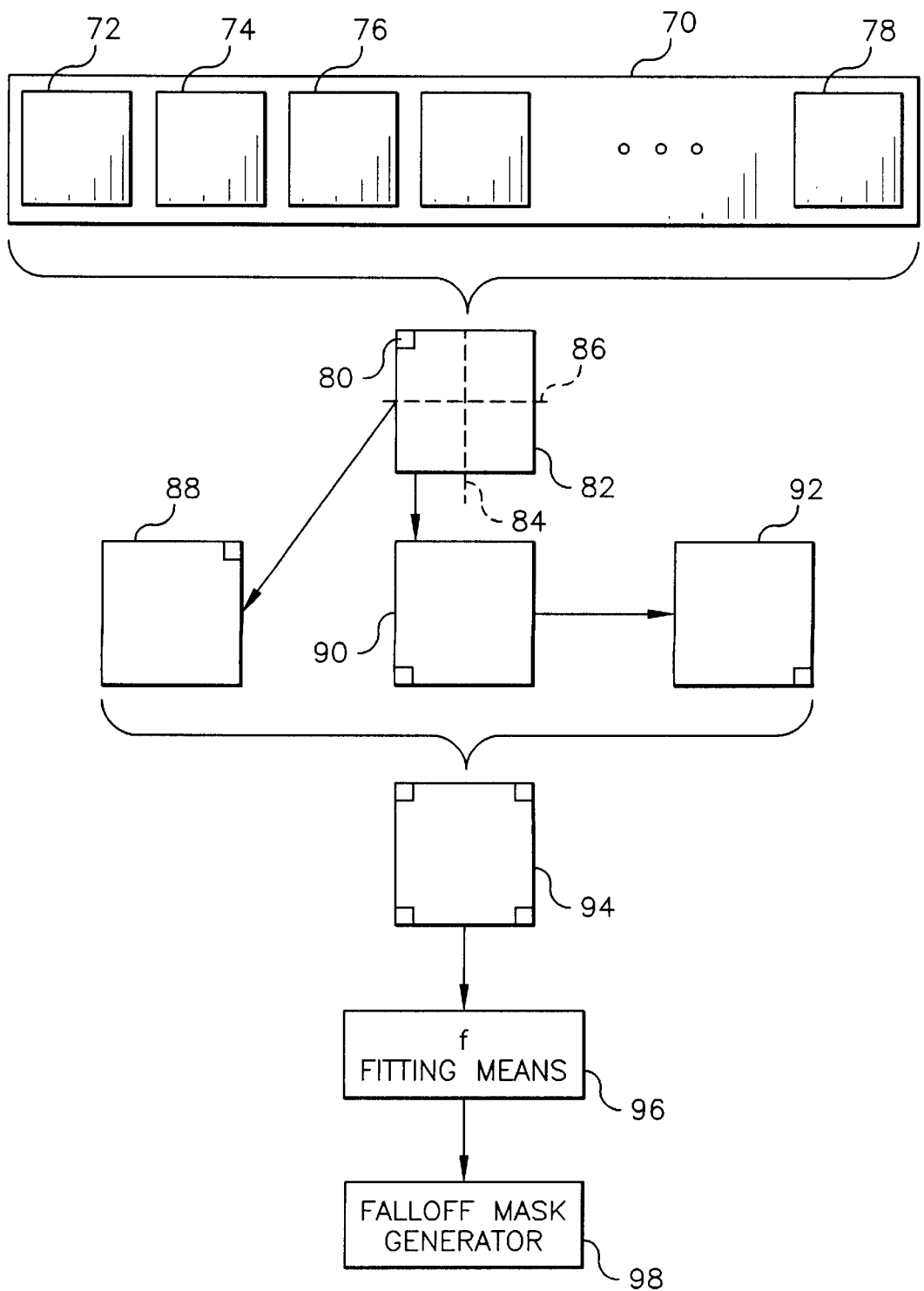
FIG 7 is a graphical representation of the averaging process in an average frame.

Reference is directed to FIG. 7. A further possibility to determine the light falloff compensation parameter for the lens falloff is done by an analysis of the pixel values of the images. For example, images on a single roll 70 of a photographic film are analyzed following a scanning operation on a scanner 30 upstream of the apparatus shown in FIG. 1. It is assumed that the images on roll 70 are taken with the same imaging device. Typically, the metric of the digitized images in 1000 times log exposure (i.e. 300 code values per stop of exposure).

According to this method, an average frame for all the frames $F_1(a,b)$, $F_2(a,b)$, $F_3(a,b)$, ..., $F_n(a,b)$, 72, 74, 76, and 78 respectively on roll 70 may be calculated. A pixel value 80 of a first average frame $\overline{F_1}$ 82 at a specific location is computed by averaging together the pixel values of all frames at that same location (for example the specific location may the upper left hand corner 82, see FIG. 7). Once computed, the first average frame $\overline{F_1}$ is forced to have symmetry about a vertical axis 84 and a horizontal axis 86 in the following manner. Three more images (averaged frames) are generated from the first average frame $\overline{F_1}$ 84 by reflecting about the horizontal axis 86, the vertical axis 84, and both the horizontal and the vertical axes 84 and 86 respectively. As a result of this process one obtains a second average frame $\overline{F_2}$ 88, which is the first average frame $\overline{F_1}$ 82 flipped about the horizontal axis 86, a third average frame $\overline{F_3}$ 90, which is the first average frame $\overline{F_1}$ 82 flipped about the horizontal axis 86 and a fourth average frame $\overline{F_4}$ 92, which is the second average frame $\overline{F_2}$ 90 flipped about the vertical axis 84. The four average frames $\overline{F_1}, \overline{F_2} \overline{F_3}$ and $\overline{F_4}$ (82, 88, 90, and 92 respectively) are then averaged together in order to generate a symmetric average frame $\overline{F_S}$ 94.

A $\cos^4$ surface is then fit to the symmetric average frame $\overline{F_s}$ 94. In this regard, many $\cos^4$ falloff surfaces are generated by varying the parameter f and the offset m in Equation 8. fit(a, b) is comparable to Equation 1. The result of the best fit here provides a value for f the light falloff correction parameter.

$$fit(a, b) = 1000 \log_{10} \cos^4\left[\tan^{-1}\left(\frac{d}{f}\right)\right] + m \quad [8]$$

The fit(x,y) which produces the minimum least squared error with reference to the symmetric average frame is the optimal fit, as illustrated by block 96 in FIG. 7. The error E of an ideal $\cos^4$ surface and the symmetric average frame, $\overline{F}_s$ (x,y) may be calculated per Equation 9, as follows:

$$E = \sum_{x,y} [fit(x, y) - \overline{F}_s(x, y)]^2 \quad [9]$$

The value of the parameter fused to generate the falloff compensation function fcf is then set to the f which was used to produce the optimal fit. Search routines and optimization techniques exist that accomplish efficient locations of the values of f and m that minimize the squared error E. Finally, the parameters are coupled to the falloff mask generator 98, in FIG. 7.

Figure 8:
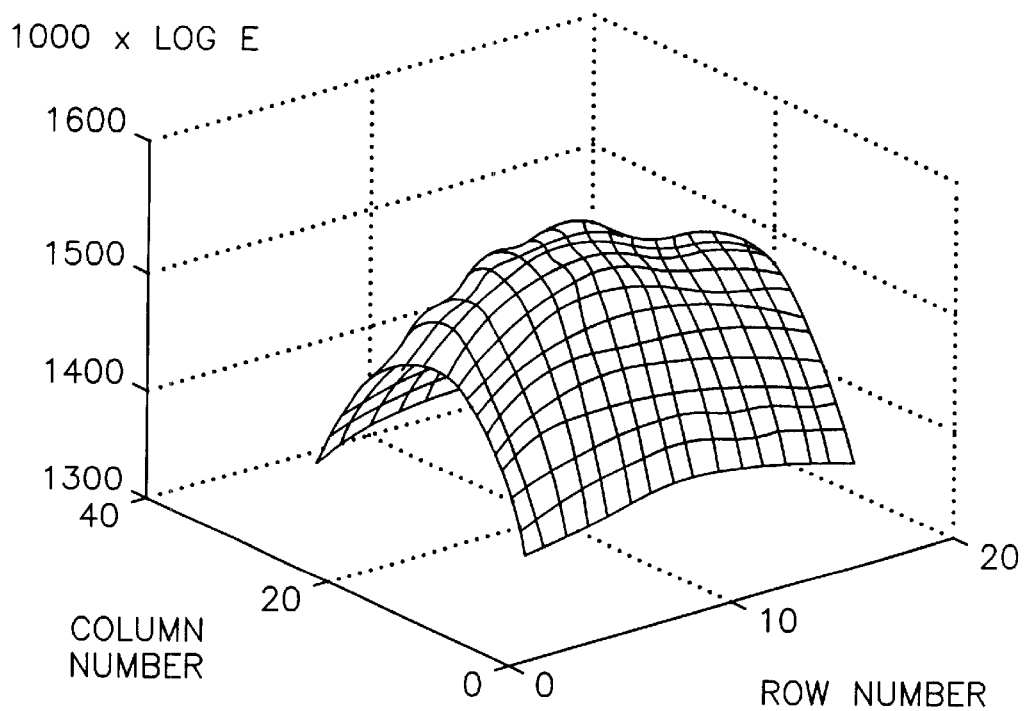
FIG. 8 is a graphical representation of intensity distribution in a symmetric average frame.

FIG. 8 is a graphical representation of intensity distribution (in 1000×log E) in an average frame. In this specific example sub-samples of 64 times 64 pixels are formed from the image. According to the sub-sampling one ends up with a digital image comprising 16 times 24 image blocks for the average frame. It is clear for a skilled person skilled in the art that other sizes of the sub-samples may be chosen and consequently their selection is obvious. The number of image blocks governs the time necessary for any calculation. So the fewer the blocks or pixels of an image to be considered the faster the result for the required parameter for the falloff compensation function.

Figure 9:
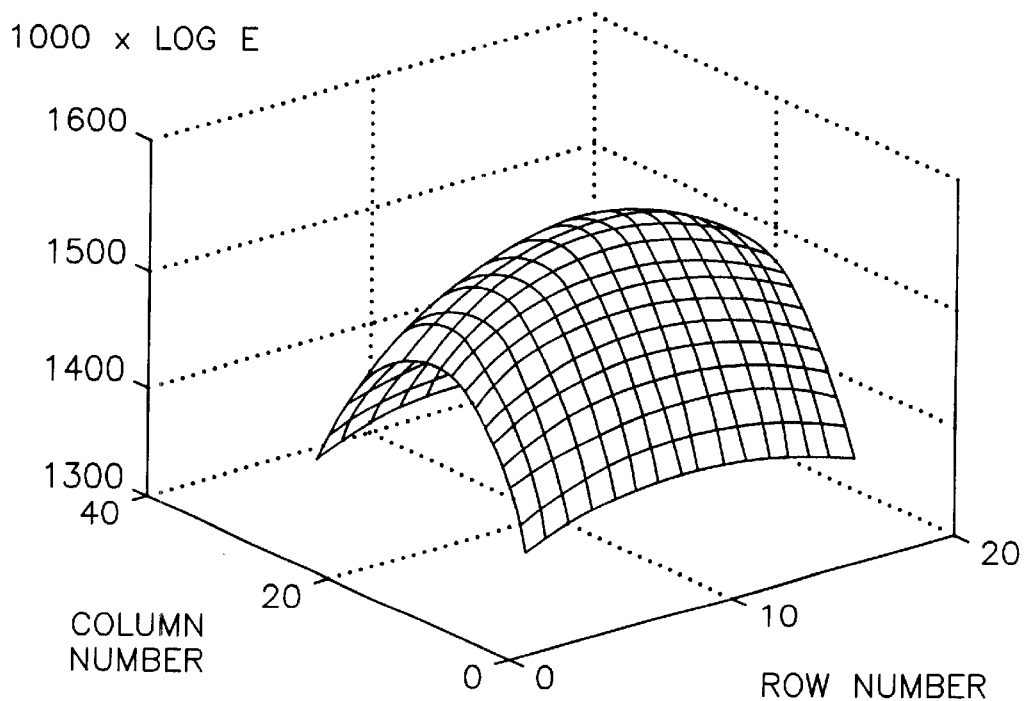
FIG. 9 is a graphical representation of a fitted $\cos^4$ surface in order to provide the fit-parameter f.
Figure 10:
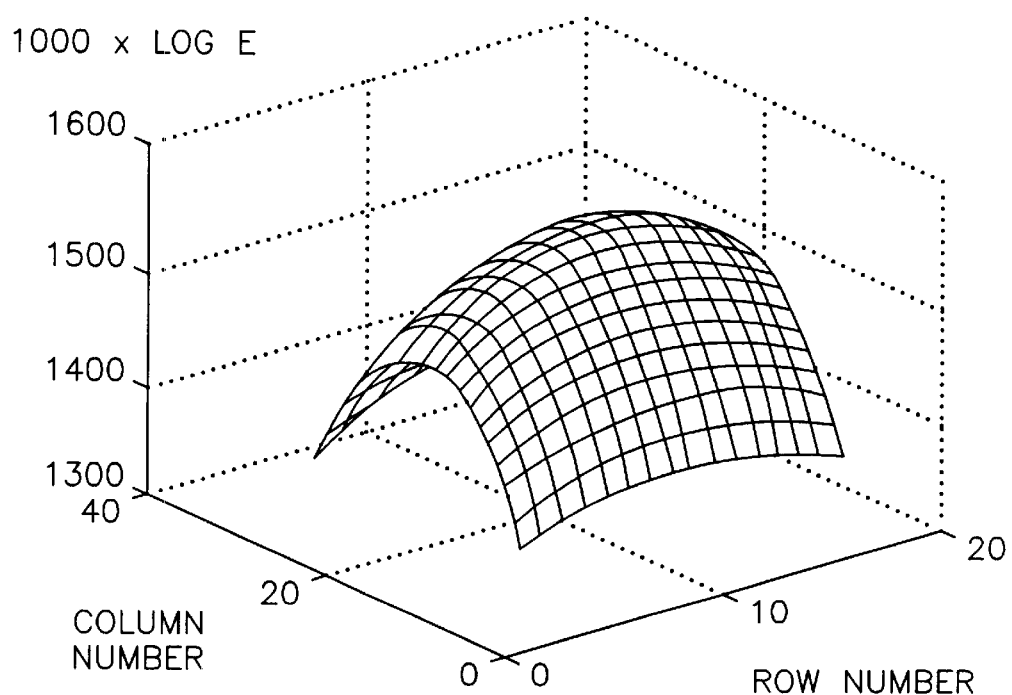
FIG. 10 is a graphical representation of the fit-parameter f.
Figure 11:
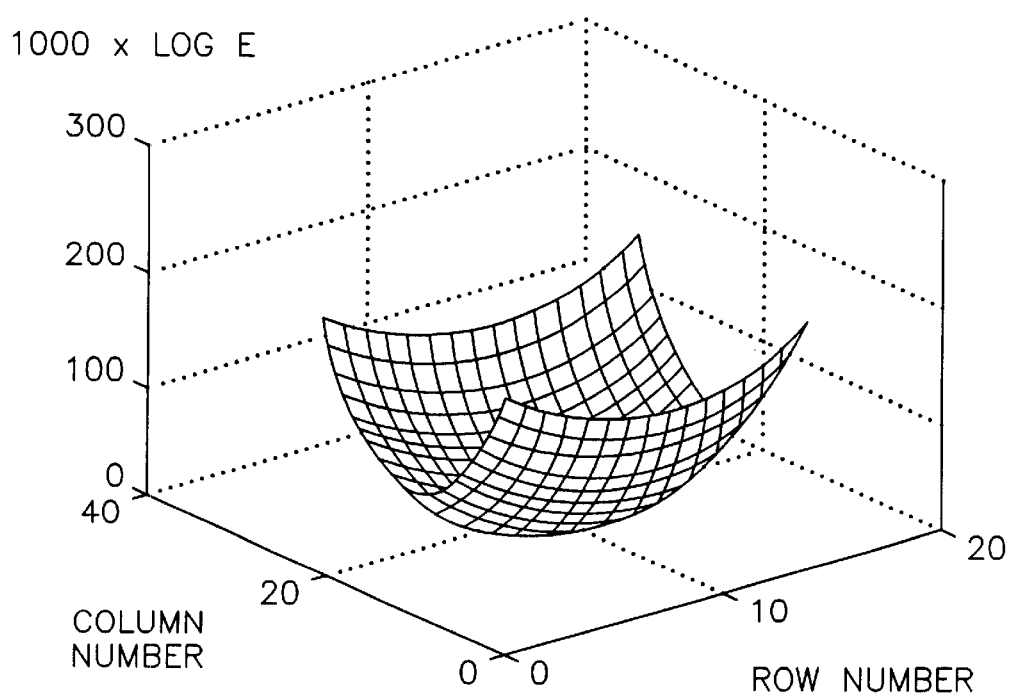
FIG. 11 is a graphical representation of a light falloff compensation mask which is applied to the pixel values of each image frame on a film roll.

According to the above sub-sampling the intensity distribution in the symmetric average frame $\overline{F}_s$ is shown in FIG. 9. The determination of the symmetric average image frame $\overline{F}_s$ is done with the same size of sub-samples as used in FIG. 8. The $\cos^4$ surface is fitted to the average image frame $\overline{F}_s$ in order to provide a fit-parameter $f_{sub}$. A graphic representation of the average image frame $\overline{F}_s$ fitted to the $\cos^4$ surface is shown in FIG. 10. $f_{sub}$ is related to the parameter f for the real image by the size of the sub-samples (for this example: f=64×$f_{sub}$). The graphical representation of a light falloff compensation mask is shown in FIG. 10. This is a three dimensional representation of the compensation values, which are applied to associated pixel values of each image frame on said film roll 70, from which the average image frame $\overline{F}_s$ is generated. FIG. 11 is a representation of the average light falloff levels image before the compensation for light falloff has been carried out.

Finally, if the source of the image is unknown, then a conservative estimate may be made for the light falloff correction parameter f in order to avoid over-compensation. The estimate is done by selecting f such that lfcm(0,0)=C wherein C is a constant value. In a preferred embodiment the constant C=150 code values assuming the data matrix is 1000 log Exposure.

As mentioned earlier, a further component contributing to the light falloff compensation arises from the light falloff caused by the firing of a flash. The flash falloff compensation function, ffcf, is also described as a mathematical function of location in the image, and is determined by the flash falloff function generator 50 in FIG. 3. In general, the flash falloff compensation function ffcf is of greater magnitude than the lens falloff compensation function lfcf. (In other words, generally ffcf(0,0)>lfcf(0,0).)

Flash falloff generally may not be radially symmetric with respect to the center of the image. In the preferred embodiment, the flash falloff compensation function ffcf may be described by the following Equation 10:

$$ffcm(x,y)=\cos^4\Theta_2 \qquad [10]$$

Where:

$$\Theta_2 = \tan^{-1}\left(\frac{d_2}{f_2}\right)$$

and $d_2$=normalized distance from masking unit 6 center to any point in the masking unit array. $d_2$ is calculated according to Equation 11

$$d_2 = \sqrt{\left(\frac{2\left(x-\frac{x_{max}}{2}\right)}{x_{max}}\right)^2 + \left(\frac{2\left(y-\frac{y_{max}}{2}\right)}{y_{max}}\right)^2} \qquad [11]$$

and $f_2$ equals the normalized flash falloff correction parameter thus, $f_2$ is an unknown parameter. The value used for $f_2$ may be estimated in a number of ways. First of all, if it is known that the flash was not used in capturing the master frame 8, then the flash falloff compensation function ffcf (x,y) equals zero for pixel values $p_{ij}$. This may be accomplished by selecting a large value (such as $1000 \times d_{max}$) for $f_2$.

If the flash was used in the capturing process, then a much lower flash correction parameter $f_2$ is appropriate. For instance, an image with harsh flash falloff may benefit greatly from a flash correction parameter $f_2$ of $1.5 \times d_{max}$. For an example, $d_{max}$ is 1.414, an approximate value of $f_2$ may be 2.1.

Another possibility for obtaining a value for the flash correction parameter $f_2$ is that an operator simply adjusts a slider of a graphical user inter face which applies a falloff compensation mask generated with light falloff compensation function with any number of choices for $f_2$. The operator adjusts the slider until he is pleased with the results. The resulting value for the $f_2$ is preserved and input to the flash falloff mask generator 50.

In an alternative embodiment of the present invention, a specific function for the flash falloff characteristics may be specified at the time of manufacture of the flash unit. This information, along with the information of whether of not the flash was used on a specific frame, may be used to construct a flash falloff compensation mask. Information of that kind may be provided on some recording areas on the photographic film. The printer reads the information and utilizes it for the calculation of the flash falloff correction parameter $f_2$.

A further possibility to calculate the flash falloff correction parameter $f_2$ is determined from an analysis of the pixel values of the images captured with the same imaging device. Typically, all of the images on a roll of film are captured with the same flash fire conditions. In many image capture systems, the scene flash fire condition may be recorded with the scene. In a simple case, the Advanced Photo System records with each scene whether the flash was fired or not.

The scenes in a common order where the flash was fired may be used to generate a symmetric average frame, as previously described. A $\cos^4$ surface may be optimally fit to the symmetric average frame by minimizing the squared error between the symmetric average frame and the $\cos^4$ surface. The value of $f_t$ that generates the optimal fit may be used as the flash correction parameter $f_2$ in the flash falloff compensation function ffcf(x,y).

The calculation of the light falloff compensation function fcf(x,y) is shown in Equation 12, and represented graphically in FIG. 3 as a multiplication of the lens falloff compensation function lfcf(x,y) and the flash falloff compensation function ffcf(x,y).

$$fcf(x,y)=lfcf(x,y) \times ffcf(x,y) \qquad [12]$$

Note that these falloff functions may be represented logarithmically (rather than in linear space as described in the present invention.) It is commonly known that the above multiplication of linear functions is equivalent to the addition of logarithmic functions. The representation of the functions described in this embodiment in a logarithmic metric would be obvious to anyone skilled in the art.

The definitions of $\Theta$ and $\Theta_2$ remain the same as described above, and the selection or determination of $\Theta$ and $\eta_2$ also remain identical to the above methods.

According to another possibility, the light falloff compensation function, fcf(x,y) may be equal to only the lens falloff compensation function, lfcf(x,y). In order to compensate for flash falloff in this embodiment, the value of f is decreased. Thus, in this embodiment, the combination of lens and flash falloff is modeled simply as a more severe case of lens falloff than is actually the case.

In determining the mask falloff compensation function mfcf(x,y) to be superimposed onto the masking unit, the falloff of the lens of the photographic copier must be considered. Thus, the mask falloff compensation function mfcf(x,y) is calculated by dividing the falloff compensation function fcf(x,y) by the photographic copier function pcf(x,y), as shown in FIG. 3 and according to Equation 13:

$$mfcf(x,y) = \frac{fcf(x,y)}{pcf(x,y)} \qquad [13]$$

As an alternative embodiment, if the falloff of the printer is unknown, the mask falloff compensation function mfcf (x,y) may be set as the equivalent to the falloff compensation function, according to Equation 14:

$$mfcf(x,y)=fcf(x,y) \qquad [14]$$

In one embodiment of the invention the method for compensating digital images may encompass additional steps to provide an output of an image, which is compensated for light falloff. The invention method comprises several steps. Also a light falloff compensation function fcf(x,y) is provided. The light falloff compensation function fcf(x,y) is constituted by a two-dimensional function (see Equation 1 or 5). The equations include an unknown parameters The specification above shows numerous possibilities for generating, determining or choosing a value for the so-called light falloff correction parameter. According to the selection of the light falloff correction parameters the light falloff compensation function fcf(x,y), and the photographic copier function pcf(x,y), a mask falloff compensation function mfcf(x,y) is generated. This function is then superimposed onto the masking unit for the purpose of allowing photographic copies to be made without the traditional artifact of dark corners.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for compensating for light falloff in a photographic master frame at the time the master frame is copied in an optical photographic copier, comprising:
   a masking unit having a plurality of pixel elements, each controllable in light transmittance; and
   a falloff mask generator for performing a falloff compensation function to produce a falloff correction parameter, said falloff mask generator having a control input for specifying any of a plurality of falloff compensation functions to be performed, wherein said control input is responsive to select said light falloff compensation function in accordance with an electronic flash type, and said falloff mask generator being coupled to said masking unit and operable to adjust the transmittance of at least one of said plurality of pixel elements in accordance with said specified functions.

2. The apparatus of claim 1 wherein said masking unit is a liquid crystal display.

3. The apparatus of claim 1 wherein said control input is manually actuatable to select one of a plurality of said light falloff compensation functions.

4. The apparatus of claim 1 wherein said control input is responsive to select said light falloff compensation function in accordance with the focal length of a lens.

5. The apparatus of claim 1 wherein said control input is responsive to select said light falloff compensation function in accordance with a film format.

6. The apparatus of claim 1 wherein said control input is responsive to select said light falloff compensation function in accordance with a camera type.

7. The apparatus of claim 6 wherein the camera type comprises a single use camera with a 35 mm film, a single use camera of the Advanced Photo System, a view finder camera for a 35 mm film, a view finder camera of the Advanced Photo System, a single lens reflex camera with a 35 mm film, a single lens reflex camera of the Advanced Photo System, a point and shoot camera with 35 mm film or a point and shoot camera of the Advanced Photo System.

8. The apparatus of claim 1 further comprising: a scanner adapted to scan the master frame to create a digital representation of the
   master frame having a plurality of data elements, and wherein said control input receives a portion of said data elements and said falloff mask
   generator calculates a light falloff compensation function in accordance therewith.

9. The apparatus of claim 8 wherein said falloff mask generator calculates the light falloff compensation function in accordance with a symmetric average of said plurality of data elements.

10. The apparatus of claim 8 wherein said scanner scans at least two master frames and said falloff mask generator calculates a light falloff compensation function in accordance with an average of data element values from said at least two of said master frames.

11. The apparatus of claim 10 wherein said at least two master frames are from a single roll of film.

12. An apparatus for compensating for light falloff in a photographic master frame at the time the master frame is copied in an optical photographic copier, comprising:
    a scanner adapted to scan the master frame to create a digital representation of the master frame, thereby generating a plurality of data elements;
    a masking unit having a plurality of pixel elements, each controllable in light transmittance;
    a falloff mask generator for performing a falloff compensation function to produce a falloff correction parameter that corrects for non-uniformity that originates with an upstream device that originally captured a plurality of images that are each on a master frame, said falloff mask generator having a control input for specifying any of a plurality of falloff compensation functions to be performed, and said falloff mask generator being coupled to said masking unit and operable to adjust the transmittance of at least one of said plurality of pixel elements in accordance with said specified functions; and
    wherein said control input receives at least some of the data elements and said falloff mask generator calculates a light falloff compensation function in accordance with a metric derived from an analysis of the plurality of images, wherein a falloff function is fit to the metric in order to evaluate a best fit and to calculate the light falloff compensation function.

13. The apparatus of claim 12 wherein said masking unit is a liquid crystal display.

14. The apparatus of claim 12 wherein said control input is manually actuatable to select one of a plurality of said light falloff compensation functions.

15. The apparatus of claim 12 wherein said control input is responsive to select said light falloff compensation function in accordance with the focal length of a lens.

16. The apparatus of claim 12 wherein said control input is responsive to select said light falloff compensation function in accordance with a film format.

17. The apparatus of claim 12 wherein said control input is responsive to select said light falloff compensation function in accordance with a camera type.

18. The apparatus of claim 17 wherein the camera type comprises a single use camera with a 35 mm film, a single use camera of the Advanced Photo System, a view finder camera for a 35 mm film, a view finder camera of the Advanced Photo System, a single lens reflex camera with a 35 mm film, a single lens reflex camera of the Advanced Photo System, a point and shoot camera with 35 mm film or a point and shoot camera of the Advanced Photo System.

19. The apparatus of claim 12 wherein said control input is responsive to select said light falloff compensation function in accordance with an electronic flash type.

20. The apparatus of claim 12 wherein said falloff mask generator calculates the light falloff compensation function in accordance with a symmetric average of said plurality of data elements, and wherein a falloff surface is fit to the symmetric average in order to calculate the light falloff compensation function.

21. The apparatus of claim 12 wherein said scanner scans at least two master frames and said falloff mask generator calculates a light falloff compensation function in accordance with an average of data element values from said at least two of said master frames.

22. The apparatus of claim 21 wherein said at least two master frames are from a single roll of film.

23. The apparatus of claim 12 wherein said control input is responsive to select said light falloff compensation function in accordance with the focal length of a lens.

24. A method of compensating for light falloff in a photographic master at the time the master is copied in an optical photographic copier that has a masking unit having a plurality of individually controllable pixel elements and a falloff mask generator with a control input; comprising the steps of:

receiving an input parameter by said control input, wherein said input parameter includes pixel values of the images captured with the same imaging device, wherein all of the images are captured with the same flash fire conditions;

calculating a falloff correction parameter by the falloff mask generator for the photographic master based upon on said input parameter;

generating an individual compensation value for at least one pixel element based on said falloff correction parameter; and superimposing the compensation value onto the masking unit such that the light falloff in the photographic copy is reduced to compensate for light falloff in the photographic master.

25. A method as recited in claim 24 wherein said superimposing step is additive.

26. A method as recited in claim 24 wherein said superimposing step is multiplicative.

27. A method as recited in claim 24 wherein said input parameter is a lens focal length.

28. A method as recited in claim 24 wherein said input parameter is the focal length of an optical printer lens.

29. A method as recited in claim 24 wherein said input parameter is a film format from which the at least one image is generated.

30. A method as recited in claim 24 wherein said input parameter is a camera type.

31. A method as recited in claim 30 wherein the camera type comprises a single use camera with a 35 mm film, a single use camera of the Advanced Photo System, a view finder camera for a 35 mm film, a view finder camera of the Advanced Photo System, a single lens reflex camera with a 35 mm film, a single lens reflex camera of the Advanced Photo System, a point and shoot camera with 35 mm film or a point and shoot camera of the Advanced Photo System.

32. A method as recited in claim 24 wherein said input parameter is pixel values of the digital scan of the master.

33. A method as recited in claim 24 wherein said input parameter is the pixel values of the images captured on a single roll of film with the same imaging device.

34. An apparatus for compensating for light falloff in a photographic master frame at the time the master frame is copied in an optical photographic copier also having a light falloff, comprising:

a masking unit having a plurality of pixel elements, each controllable in light transmittance; and a falloff mask generator for performing a falloff compensation function to produce one or more falloff correction parameters for the photographic master frame and the photographic copier, said falloff mask generator having a control input for specifying any of a plurality of falloff compensation functions to be performed, wherein said control input is responsive to select said light falloff compensation function in accordance with an electronic flash type used during the capture of the photographic master frame, and said falloff mask generator being coupled to said masking unit and operable to adjust the transmittance of at least one of said plurality of pixel elements in accordance with said specified functions to compensate for light falloff in the photographic master frame and from the photographic copier.

35. The apparatus of claim 34 wherein said masking unit is a liquid crystal display.

36. The apparatus of claim 34 wherein said control input is responsive to select said light falloff compensation function in accordance with a film format.

37. The apparatus of claim 34 wherein said control input is responsive to select said light falloff compensation function in accordance with a camera type.

38. The apparatus of claim 37 wherein said control input is responsive to select said light falloff compensation function in accordance with the focal length of a lens associated with the camera type and a lens of the photographic copier.

* * * * *